Jan. 21, 1964  L. LEITZ ETAL  3,118,359
OBJECTIVE ADJUSTING MEANS
Filed Sept. 30, 1960  2 Sheets-Sheet 1

INVENTORS
LUDWIG LEITZ
HEINRICH STAUBACH
KURT JENSEN
BY Toulmin & Toulmin
ATTORNEYS Jan. 21, 1964     L. LEITZ ETAL     3,118,359
OBJECTIVE ADJUSTING MEANS
Filed Sept. 30, 1960     2 Sheets-Sheet 2

INVENTORS
LUDWIG LEITZ
HEINRICH STAUBACH
KURT JENSEN
BY Toulmin & Toulmin
ATTORNEYS

United States Patent Office 3,118,359
Patented Jan. 21, 1964

3,118,359
OBJECTIVE ADJUSTING MEANS
Ludwig Leitz, Wetzlar (Lahn), Germany, Heinrich Ivan Staubach, Midland, Ontario, Canada, and Kurt Jensen, Wetzlar (Lahn), Germany, assignors to Ernst Leitz G.m.b.H., Wetzlar (Lahn), Germany
Filed Sept. 30, 1960, Ser. No. 59,762
Claims priority, application Germany Oct. 3, 1959
7 Claims. (Cl. 95—45)

The present invention relates to means for adjusting the distance and focal length of objectives having variable focal lengths, more particularly, to the arrangement of the adjusting members for varying the distance and the focal length with a minimum of effort.

In photographic still or moving picture cameras having objectives with variable focal lengths individual lens systems of the objectives must be positioned with respect to each other or with respect to the plane of the film for adjusting both the distance and the focal length.

Previously, numerous arrangements have been proposed to solve the problem of adjusting both the distance and the focal length with a minimum of effort and inconvenience to the user of the camera. One such known arrangement comprised the positioning of concentric rings having knurled surfaces about the objective mount. These rings respectively adjusted the distance and the focal length.

Another arrangement comprised the use of a knurl ring concentric with the objective mount for one adjustment and for the second adjustment an adjusting knob was positioned laterally of the objective mount with the axis of the adjusting knob being substantially normal to the optical axis of the objective mount. In addition, it has been proposed to mount a lever on the objective mount which lever is pivotable both in a plane in the direction of the optical axis as well as a plane substantially vertical to the optical axis. Each of these pivoting movements controlled one of the above-mentioned objective adjustments.

These known structures as proposed above gave rise to certain problems and difficulties. With arrangements employing the knurl rings it was necessary to position the user's hand above a considerable portion of the circumference of the objective. As a result, the view through the range finder was frequently obstructed by these manual manipulations of the knurl rings.

The pivoting levers for adjusting a focal length and distance contributed to a tilting effect of the camera which made it extremely difficult to keep the intended subject of the picture in the field of view of the range finder.

The present invention is directed to eliminating the above-mentioned difficulties and to provide an adjusting arrangement for both the distance and focal length which arrangement is so mounted with respect to the objective mount that use of the adjusting arrangement will not in any way inconvenience the user of a camera. In addition, this adjusting arrangement is so conveniently located that it is particularly adapted for varying the distance of the objective during operation of the camera in the manner of the so-called "zoom" lens.

The present invention essentially comprises individual gear trains between the adjusting members and each of the optical members which are to be adjusted. At least one element in each gear train is mounted coaxially with the corresponding element of the other gear train and on a geometric axis located externally of the optical axis and at an angle thereto. The coaxial elements may comprise the adjusting knobs or the coaxial elements can be selectively operated by a single adjustment knob which is readily moved into driving engagement with either of the two coaxial elements.

It is, therefore, the principal object of this invention to provide a novel and improved arrangement of adjusting structures for conveniently and quickly varying the distance and focal length of a camera.

It is another object of this invention to provide an adjusting structure for the focal length and distance of a camera which structure is so positioned that manipulation thereof will not obstruct the view through the range finder nor interfere with the aiming of the camera.

It is a further object of this invention to provide an arrangement wherein the single adjusting member can be used to selectively and individually control the focal length and distance of a camera.

Other objects and advantages of this invention will become readily apparent upon reference to the accompanying description when taken in conjunction with the following drawing, wherein FIGURE 1 is a sectional view of the objective mount of a camera incorporating the present invention and showing the arrangement of the two coaxial adjusting knobs;

Figure 1:
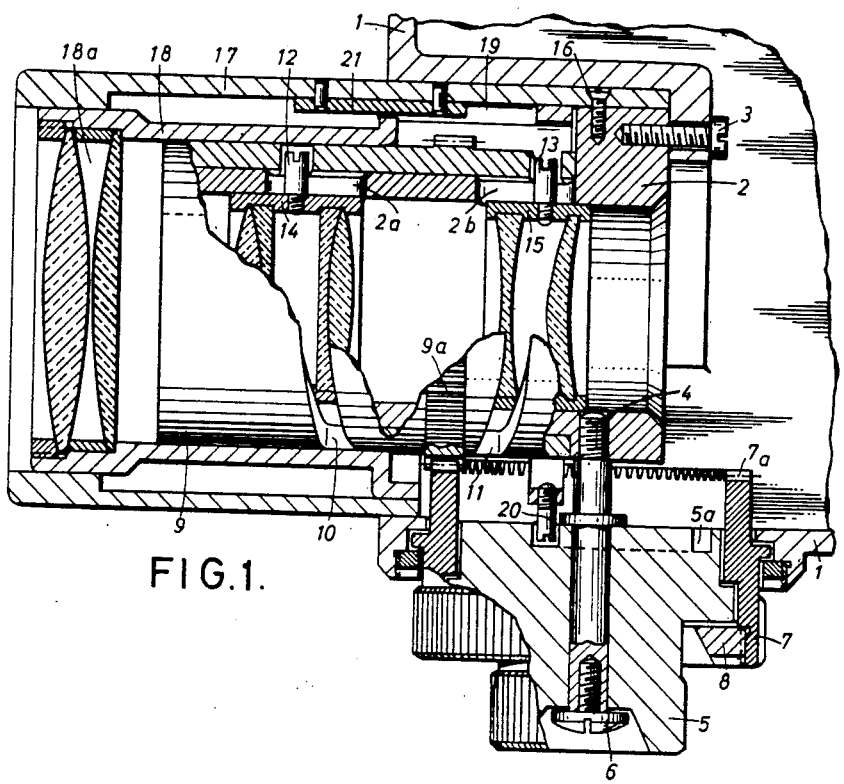

Specific embodiments of the present invention will next be described with reference to the drawings wherein like reference symbols indicate the same parts throughout the various views. With particular reference to FIGURE 1 there is mounted a camera casing 1 which has an inner cylinder 2 mounted therein by screws 3. A shaft 4 has one end thereof mounted in the cylinder 2 on the lower portion thereof and there is an adjusting knob 5 fixedly mounted on the end of the shaft 4 by means of a screw 6. A second adjusting knob 7 is coaxially arranged with respect to the adjusting knob 5 and is secured in position by a ring 8 which is threadedly received in a central recess of the adjusting knob 7. Both the adjusting knobs 5 and 7 have knurled peripheral surfaces to facilitate gripping of the knobs when adjustments are made.

At the end of the adjusting knob, facing the objective mount, there is provided a crown gear 7a. There is a hollow cylinder 9 slideably mounted on the inner cylinder 2. The cylinder 9 has a plurality of gear teeth 9a on the periphery thereof so as to form a spur gear which meshes with the crown gear 7a. The cylinder 9 has two cam grooves 10 and 11 therein which form a barrel or cylindrical cam. Pins 12 and 13 comprise cam followers which are received within the cam grooves 10 and 11. The pins 12 and 13 are fixedly mounted on optical members 14 and 15, respectively, which comprise lens systems. Other forms of lens systems may be employed instead of those specifically illustrated at 14 and 15.

Optical members 14 and 15 are slideably mounted within the inner cylinder 2 so as to move along the optical axis of the objective mount. The pins 12 and 13 project through longitudinal slots 2a and 2b, respectively, which are in the wall of the inner cylinder 2. The slots 2a and 2b extend in the direction of the optical axis.

With the exception of adjusting knob 5 all of the above-described elements are employed in moving the optical members for adjusting the focal length.

The focal length is adjusted by rotation of the adjusting knob 7. Rotation of the knob 7 will cause the crown gear 7a to rotate the cylinder 9 by driving engagement with the gear teeth 9a. The pins 12 and 13 are received in the cam grooves 10 and 11 but cannot rotate since they project through the linear slots 2a and 2b which are stationary and which extend substantially vertical with respect to the direction of rotation. Due to the movement of the pins 12 and 13 in the slots 2a and 2b and the curvature of the cam grooves 10 and 11 rotation of the cylinder 9 will cause the pins 12 and 13 and accordingly the optical members 14 and 15 to be moved in the direction of the optical axis. The extent of this movement will depend on the particular shape of the cam grooves 10 and 11 and the angle through which the adjusting knob 7 is rotated.

Figure 3:
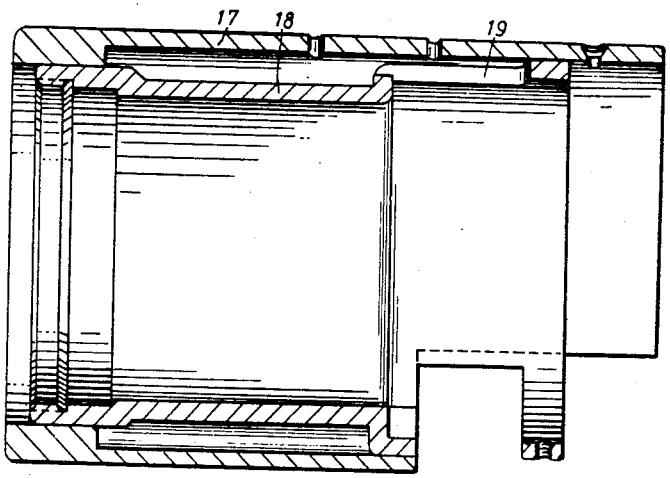
FIGURE 3 is a sectional view similar to that of FIGURE 1 but for purposes of clarity showing only a portion of the objective mount structure.

With respect to adjusting the distance of the camera a guide tube 17 is fixedly mounted on the inner cylinder 2 by means of a screw 16. An additional cylinder 18 is mounted between the guide tube 17 and the cylinder 9. The cylinder 18 has in the front portion thereof an optical member 18a comprising a lens system which must be displaced or moved in order to adjust the distance of the objective mount. A pin 20 projects from the cylinder or distance member 18 and is received in a cam groove 5a in a surface of the adjusting knob 5 so as to comprise a plate cam. The cam groove 5a is formed in that side of the surface of the adjusting knob 5 which faces the optical axis and essentially comprises a two-sided Archimedean or similar curve about the rotary axis of the adjusting knob 5. On the upper surface of the cylinder 18 there is a groove 19 extending substantially parallel to the optical axis. A guide member 21 which is mounted on the guide tube 17 slides within the groove 19 and functions to guide the cylinder 18 in a straight line. Both the guide tube 17 and the cylinder 18 are slotted, as may be seen in FIGURE 3, to permit the crown gear 7a to mesh with the gear teeth 9a.

The distance is adjusted by rotation of the knob 5. Rotation of this knob will bring about a movement of the pin 20 which functions as a cam follower with respect to the cam groove 5a. Accordingly, the cylinder 18 will be moved in a straight line because of the relationship of the groove 19 and the guide member 21. This straight line movement will be parallel to the optical axis. The groove 5a is continuous so that the adjusting knob 5 can be rotated through an angle of 360° and more. When an angle of 360° has been reached the cylinder 18 and the optical member 18a will have performed a reciprocating movement.

Figure 2:
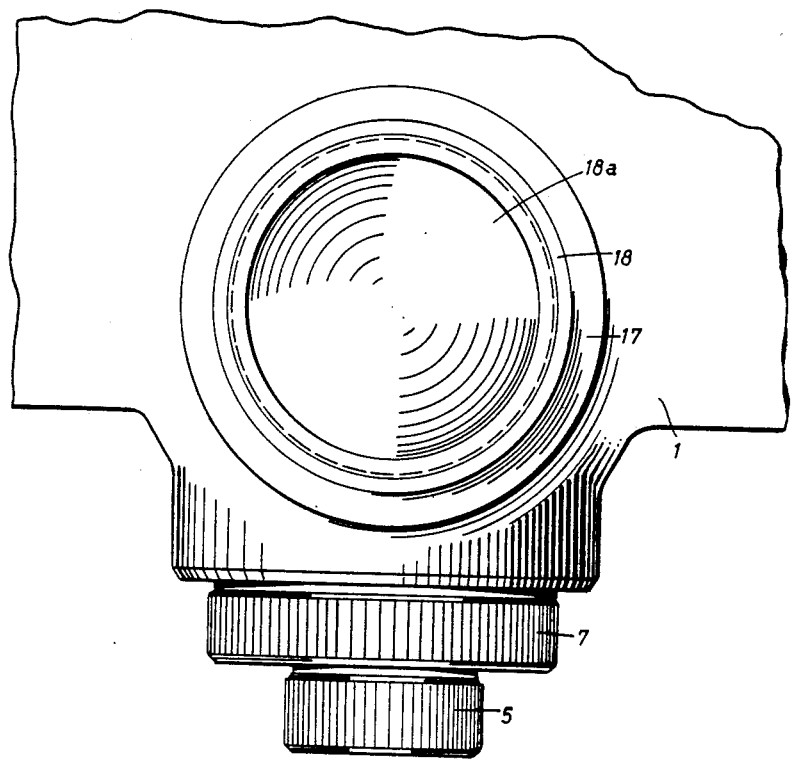
FIGURE 2 is a front elevational view of a camera incorporating the present invention and showing the objective and adjusting knobs illustrated in FIGURE 1.
Figure 4:
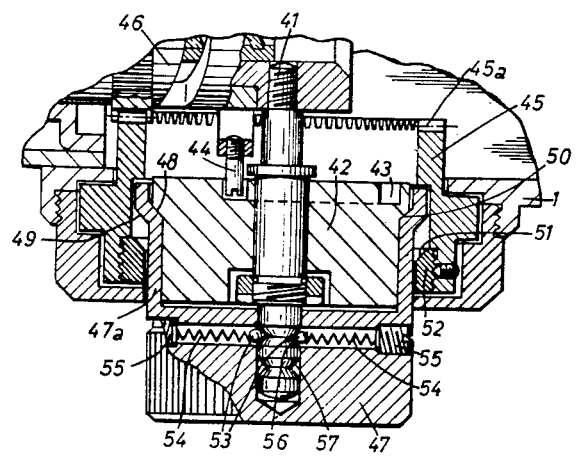
FIGURE 4 is a sectional view similar to that of FIGURE 1 but showing only the adjusting structure which is a modification of the adjusting knob structure shown in FIGURES 1 and 2.

Proceeding next to FIGURE 4 there is shown a modification of the above-described adjusting arrangement wherein a single adjusting knob may be used to adjust either the focal length or the distance. With further reference to FIGURE 4 a disk 42 is positioned on a shaft 41 which substantially corresponds to the shaft 4 previously described. The disk 42 has a cam groove 43 which is similar to the cam groove 5a. A peg or cam follower 44 is mounted on the cylinder 18 and is received in the groove 43. This disk 42 is surrounded by a crown gear 45 whose gear teeth 45a mesh with the teeth on a curved cylinder 46 which corresponds to the cylinder 9. There is a tube 47a formed of a single piece of material so that one end thereof is solid and comprises adjusting knob 47 with the inner end 47a rotating between the disk 42 and the crown gear 45. The tubular portion 47a has a pair of sloping surfaces 48 and 49 which cooperate with corresponding sloping surfaces 50 and 51, on the disk 42 and at a screw ring 52, respectively, which ring 52 is threaded into the ring gear 45. The adjusting knob 47 is provided with locking means comprising balls 53, springs 54 and a screw 55 together with grooves 56 and 57 axially spaced along the shaft 41. The operation of this modification is analogous to the operation of the embodiment described in FIGURES 1 to 3. The two coaxial adjusting knobs are not operated directly since operation is effected by means of axially displacing the adjusting knob 47. As soon as the knob 47 is locked in either of its two positions the sloping portions 48 and 50 or 49 and 51 are drivingly connected together in a manner similar to a friction clutch. Accordingly, rotation of the knob 47 will either rotate the disk 42 or the crown gear 45 which, in turn, will actuate either the distance or focal length members in a manner similar to that described above.

Thus it can be seen that the present invention provides an effective yet conveniently arranged adjusting structure for selectively positioning either the focal length or distance of a camera. Further, this arrangement eliminates many of the problems and disadvantages inherent in previously known arrangements as described above.

It will be understood that this invention is susceptible to modification in order to adapt it to different usages and conditions and, accordingly, it is desired to comprehend such modifications within this invention as may fall within the scope of the appended claims.

What we claim is:

1. In a camera, a stationary cylinder having at least one axial guiding slot; a first lens mount including at least one first cylindrical element coaxially mounted in said stationary cylinder; a second lens mount including a second cylindrical element coaxially mounted on said stationary cylinder, one of said lens mounts being axially displaceable for focal length adjustment, the other one of said lens mounts being axially displaceable for distance and focusing adjustment; a rotatable third cylindrical element coaxially mounted on said stationary cylinder and having guiding means projecting through said guiding slot for imparting an axial movement upon said first cylindrical element upon rotation; a first and a second adjusting member coaxially disposed at said camera and at an angle relative to the axis of said cylinders; a first gearing means comprising a plurality of gear teeth on the periphery of said third cylindrical member to form a gear thereon, and a crown gear on said first adjusting means meshing with said gear teeth for imparting a rotary motion of said first adjusting member upon said third cylindrical element; and a second gearing means with cam and groove arrangement comprising a cam follower projecting from said second cylindrical member, and a plate cam on said second adjusting means having a grooved cam surface therein receiving said cam follower for imparting a rotary motion of said second adjusting member as axial motion upon said second cylindrical element.

2. In a camera as set forth in claim 1 comprising: a single, manual, axially adjustable adjusting member drivingly and selectively engageable with either one of said first and second adjusting members for actuation thereof; and means for selectively retaining said single adjusting member in driving engagement with one of said first and second adjusting members.

3. In a camera as set forth in claim 1, said adjusting means being individually manually adjustable.

4. In a camera, a stationary cylinder having an axis and at least one axial guiding slot; a first lens mount including at least one cylindrical element coaxially mounted in said stationary cylinder and having a first cam projecting through said guiding slot; a second lens mount including a second cylindrical element coaxially disposed with respect to said stationary cylinder, one of said lens mounts being axially displaceable for focal length adjustment, the other one of said lens mounts being axially displaceable for distance and focussing adjustment, said second cylindrical element having a second cam; a third rotatable cylindrical element coaxially mounted on said stationary cylinder for rotation thereon and having a slot receiving one of said first and second cams for imparting an axial movement upon the cylindrical element having the cam received in said slot of said third cylindrical element upon rotation thereof, said second cylindrical element being axially displaceably mounted on said third cylindrical element; a first and a second adjusting member coaxially disposed at said camera and at an angle relative to said axis of said cylinders; gearing means interconnecting said first adjusting member and said third cylindrical element for transferring a rotary adjusting motion of said first adjusting member as rotary motion of said third cylindrical element about said cylinder axis; and means on said second adjusting member defining a follower groove receiving the other one of said first and second cams for transmitting a rotary adjusting motion of said second adjusting member as axial movement upon the cylindrical element having the said other cam received by said follower groove.

5. The combination as set forth in claim 4, said cylinder axis being at right angles to the common axis of said adjusting members.

6. The combination as set forth in claim 4, said cylinder axis intersecting the common axis of said adjusting members.

7. In a camera, a stationary cylinder having two axial guiding slots; two individually axially displaceable lens mounts in said cylinder; a second cylinder mounted on said stationary cylinder having two cam grooves, there being respectively two pins in said grooves and respectively engaging said lens mounts for individually axially displacing said lens mounts upon rotation of said second cylinder; a third lens mount disposed on said stationary cylinder axially displaceable relative thereto; first and second rotary coaxial adjusting means with the axis being inclined to the common axis of said cylinders; a first gearing means comprising a plurality of gear teeth on the periphery of said third cylindrical member to form a gear thereon, and a crown gear on said first adjusting means meshing with said gear teeth for imparting the rotary motion of said first adjusting means as rotary motion upon said second cylinder; and a second gearing means with cam and groove arrangement comprising a cam follower projecting from said second cylindrical member, and a plate cam on said second adjusting means having a grooved cam surface therein receiving said cam follower for transmitting a rotary motion of said second adjusting means as axial displacement upon said third lens mount.

References Cited in the file of this patent
UNITED STATES PATENTS

| | | |
|---|---|---|
| 2,511,646 | Marmour | June 13, 1950 |
| 2,724,988 | Peters | Nov. 29, 1955 |
| 2,732,763 | Back | Jan. 31, 1956 |
| 2,924,146 | Back | Feb. 9, 1960 |
| 2,983,209 | Werner | May 9, 1961 |